US012677257B2

(12) United States Patent
Lin et al.

(10) Patent No.: US 12,677,257 B2
(45) Date of Patent: Jul. 7, 2026

(54) USER EQUIPMENT, RESOURCE SELECTION METHOD IN SIDELINK COMMUNICATION, AND STORAGE MEDIUM

(71) Applicant: GUANGDONG OPPO MOBILE TELECOMMUNICATIONS CORP., LTD., Dongguan (CN)

(72) Inventors: Huei-Ming Lin, Taipei (TW); Zhenshan Zhao, Dongguan (CN); Shichang Zhang, Dongguan (CN); Yi Ding, Dongguan (CN); Teng Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 342 days.

(21) Appl. No.: 18/400,520

(22) Filed: Dec. 29, 2023

(65) Prior Publication Data

US 2024/0172184 A1 May 23, 2024

Related U.S. Application Data

(63) Continuation of application No. PCT/CN2021/111263, filed on Aug. 6, 2021.

(51) Int. Cl.
| | |
|---|---|
| *H04W 72/02* | (2009.01) |
| *H04W 72/0446* | (2023.01) |
| *H04W 72/40* | (2023.01) |
| *H04W 92/18* | (2009.01) |

(52) U.S. Cl.
CPC ....... *H04W 72/02* (2013.01); *H04W 72/0446* (2013.01); *H04W 72/40* (2023.01); *H04W 92/18* (2013.01)

(58) Field of Classification Search
CPC . H04W 72/02; H04W 72/40; H04W 72/0446; H04W 92/18
See application file for complete search history.

(56) References Cited

U.S. PATENT DOCUMENTS

| | | | |
|---|---|---|---|
| 12,520,201 B2 * | 1/2026 | Zhao | H04W 28/26 |
| 2021/0307060 A1 * | 9/2021 | Agiwal | H04W 36/00837 |

(Continued)

FOREIGN PATENT DOCUMENTS

| | | |
|---|---|---|
| CN | 108024266 | 5/2018 |
| CN | 108616839 | 10/2018 |

(Continued)

OTHER PUBLICATIONS

CMCC, "Discussion on resource allocation for power saving," 3GPP TSG RAN WG1 #103-e, R1-2008031, Oct. 2020.

(Continued)

*Primary Examiner* — Duc C Ho
(74) *Attorney, Agent, or Firm* — Hodgson Russ LLP

(57) ABSTRACT

A user equipment (UE), a resource selection method in sidelink communication, and a storage medium are provided. The resource selection method includes triggering a resource selection procedure for sidelink (SL) transmission of a SL data, wherein the SL data for transmission has a resource reservation interval set to zero or not provided at all, and utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data.

16 Claims, 3 Drawing Sheets

610 →

612 → Triggering a resource selection procedure for sidelink (SL) transmission of a SL data, wherein the SL data transmission has a resource reservation interval set to zero or not provided at all 614 → Utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data

(56) References Cited

U.S. PATENT DOCUMENTS

| | | | |
|---|---|---|---|
| 2022/0224497 A1* | 7/2022 | Li | ......................... H04W 76/14 |
| 2022/0295514 A1* | 9/2022 | Shin | ................. H04W 52/0216 |
| 2024/0031997 A1* | 1/2024 | Lin | ......................... H04W 4/40 |

FOREIGN PATENT DOCUMENTS

| | | |
|---|---|---|
| WO | 2020033226 | 2/2020 |
| WO | 2022120394 | 6/2022 |

OTHER PUBLICATIONS

Fujitsu, "Considerations on partial sensing in NR V2X," 3GPP TSG RAN WG1 Meeting #103-E, R1-2007787, Oct. 2020.

WIPO, International Search Report and Written Opinion for International Application No. PCT/CN2021/111263, May 9, 2022.

Mediatek Inc., "Discussion on sidelink power saving," 3GPP TSG RAN WG1 #105-e, R1-2105380, May 2021.

Lenovo et al., "Sidelink resource allocation for power saving," 3GPP TSG RAN WG1 #105-e, R1-2104869, May 2021.

LG Electronics, "Discussion on resource allocation for power saving," 3GPP TSG RAN WG1 Meeting #105-e, R1-2106098, May 2021.

OPPO, "Power saving mechanisms in NR sidelink," 3GPP TSG RAN WG1 #105-e, R1-2104755, May 2021.

OPPO, "FL summary for AI 8.11.1.1—resource allocation for power saving (3rd check point)," 3GPP TSG RAN WG1 #104b-e, R1-2104092, Apr. 2021.

EPO, Extended European Search Report for EP Application No. 21952426.1, Apr. 29, 2024.

* cited by examiner

30

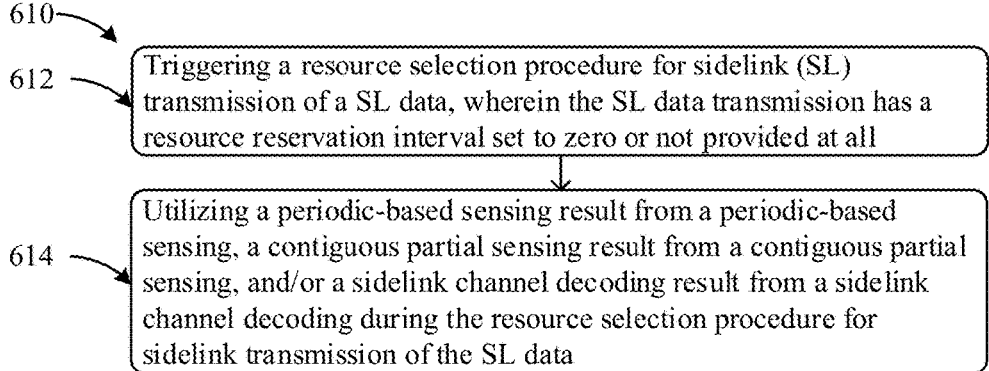

610

612 — Triggering a resource selection procedure for sidelink (SL) transmission of a SL data, wherein the SL data transmission has a resource reservation interval set to zero or not provided at all 614 — Utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data

FIG. 4

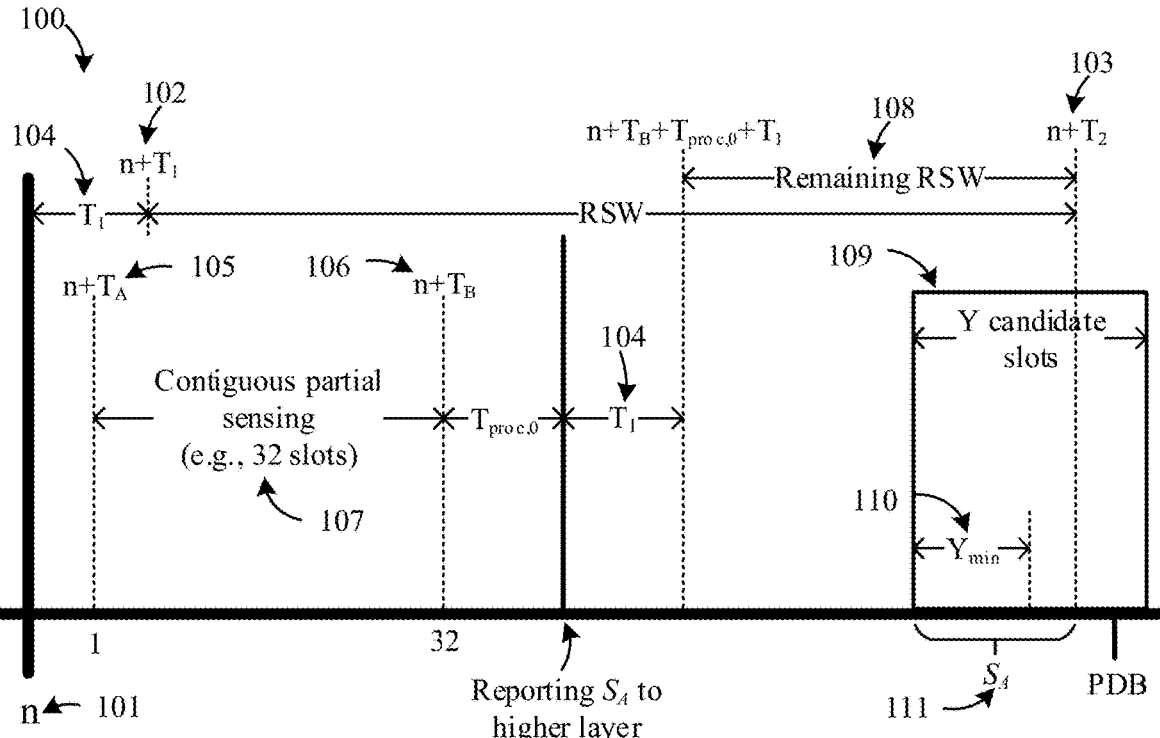

FIG. 5

USER EQUIPMENT, RESOURCE SELECTION METHOD IN SIDELINK COMMUNICATION, AND STORAGE MEDIUM

CROSS REFERENCE TO RELATED APPLICATION(S)

This application is a continuation of International Application No. PCT/CN2021/111263, filed Aug. 6, 2021, the entire disclosure of which is incorporated herein by reference.

BACKGROUND OF DISCLOSURE

1. Field of the Disclosure

The present disclosure relates to the field of communication systems, and more particularly, to a user equipment (UE), a resource selection method in sidelink communication, and a storage medium, which can provide a good communication performance and/or provide high reliability.

2. Description of the Related Art

For a periodic traffic, arrival of sidelink (SL) data packets at layer 1 (L1) for SL transmission is pre-determined, such that SL resource sensing can be performed prior to the arrival. However, transmission trigger timing for aperiodic traffic is unpredictable since generation/arrival of data packets at L1 is not known in advance. Therefore, pre-sensing of SL resources for aperiodic transmissions would not be possible before the data arrival. As a result, in a sidelink resource pool with mixed periodic and aperiodic traffics, transmission collision from the aperiodic traffic to semi-persistent scheduling (SPS)/periodic reservations cannot be avoided.

Therefore, there is a need for a user equipment (UE) and a sidelink resource exclusion method, which can solve issues in the prior art, mitigate a transmission collision, provide a good communication performance, and/or provide high reliability.

SUMMARY

In a first aspect of the present disclosure, a user equipment (UE) includes a memory, a transceiver, and a processor coupled to the memory and the transceiver. The processor is configured to trigger a resource selection procedure for sidelink (SL) transmission of a SL data, wherein the SL data for transmission has a resource reservation interval set to zero or not provided at all, and the processor is configured to utilize a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data.

In a second aspect of the present disclosure, a resource selection method in sidelink communication by a user equipment (UE) includes triggering a resource selection procedure for sidelink (SL) transmission of a SL data, wherein the SL data for transmission has a resource reservation interval set to zero or not provided at all, and utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data.

In a third aspect of the present disclosure, a non-transitory machine-readable storage medium has stored thereon instructions that, when executed by a computer, cause the computer to perform the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a resource selection method in sidelink communication by a user equipment (UE) according to an embodiment of the present disclosure.

FIG. 5 is a schematic diagram illustrating an exemplary illustration of a proposed method of utilizing periodic-based and contiguous partial sensing results for sidelink (SL) transmission of aperiodic SL data traffic according to an embodiment of the present disclosure.

DETAILED DESCRIPTION OF EMBODIMENTS

Figure 1:
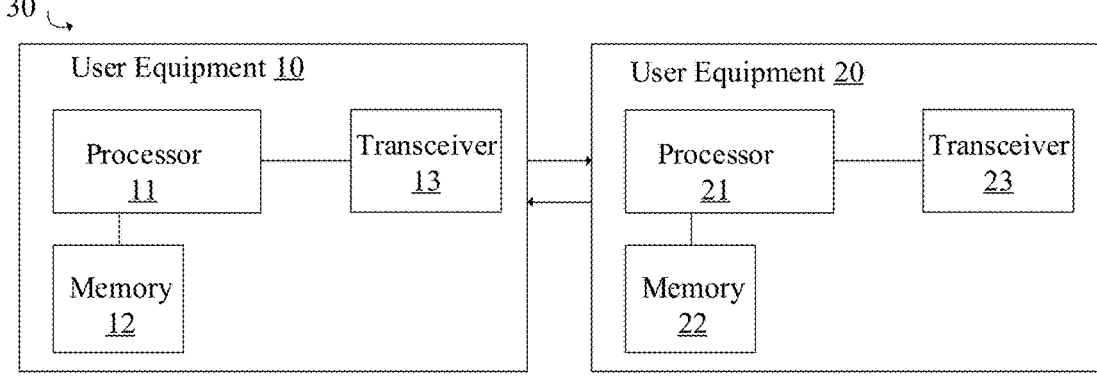
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For the development of 5th generation-new radio (5G-NR) based sidelink communication system, a radio technology is primarily designed to support autonomous driving, vehicle platooning and extended sensor sharing use cases in advanced vehicle-to-everything (V2X), and for which the communication user equipment (UE) can be assumed to have unlimited power supply (i.e., connected to vehicle's battery). As such, it is expected and enables that a sidelink (SL) UE to receive and monitor SL radio channel(s) all the time for driving related messages to maintain road safety. Besides the data reception, a NR sidelink UE also transmits its own driving messages just as other surrounding V2X UEs to maintain road safety and keep traffic flow efficiently. In order to avoid transmit (Tx) collisions among SL UEs, a UE that has a data packet to transmit is required to perform sensing of SL resources on the radio channel to determine their reservation status/usage (e.g., whether it is already reserved by another UE and the interference level) before selecting one or more appropriate resources for its own transmission. Since a V2X UE with unlimited supply of power is receiving data messages all the time, it is reasonable to expect that the UE has full sensing results of the SL channel whenever it has a data message to transmit.

As the application and usage of sidelink technology is expanding to other device types and industry verticals, the assumption that a sidelink UE always an has unlimited power supply can, however, no longer hold true for vulnerable road users such as pedestrians and bicycle riders as part of V2X services, emergency responder backpack units in public safety services and augmented reality (AR)/virtual reality (VR) glasses in commercial applications. In order to achieve power saving for these emerging new UE types, so as to maximize the operating duration of a SL communication device, one possible approach is to reduce/minimize the among the resource sensing that a UE needs to perform on a SL channel without sacrificing significant radio performance due to the potential increase in Tx collisions.

There are currently two types of resource reservations in SL communication, namely periodic reservation (a.k.a. semi-persistent scheduling (SPS) reservation) and dynamic assignment, and both of which can be used and indicated by a sidelink Tx-UE using sidelink control information (SCI). Also, there are two types of data traffic in SL communication, specifically periodic and aperiodic traffics and they are often referred as periodic and aperiodic transmissions. For the periodic traffic/transmission, a Tx-UE uses the dynamic resource assignment to reserve the current and future SL resources of up to 32 slots for the initial and retransmissions of a media access control (MAC) packet data unit (PDU) or transport block (TB). At the same time the UE uses the SPS reservation to reserve periodic resources for transmission of the next MAC PDU or TB that could be up to 1000 ms later. As such, it is expected that data packet arrival for periodic traffic/transmission will occur at a regular and predictable time interval. And hence, some pre-sensing on the SL channel can be performed by the Tx-UE prior to the arrival of periodic traffic in order to determine and select transmission resources that have not been reserved by other UEs.

Unlike the periodic traffic, where the arrival of SL data packets at L1 for SL transmission is pre-determined such that SL resource sensing can be performed prior to the arrival, the transmission trigger timing for aperiodic traffic on the other hand is unpredictable since the generation/arrival of data packets at L1 is not known in advance. Therefore, pre-sensing of SL resources for aperiodic transmissions would not be possible before the data arrival. As a result, in a sidelink resource pool with mixed periodic and aperiodic traffics (i.e., when the configured parameter sl-MultiReserveResource for the resource pool is enabled), Tx collision from aperiodic traffic to SPS/periodic reservations cannot be avoided.

In some embodiments, for the present inventive method of resource sensing and selection for SL communication, it aims to mitigate the above problem of transmission collision due to lack of pre-sensing available for the unpredictable arrival of aperiodic data for transmission by opportunistically reusing resource sensing results from another periodic-based transmission and/or resource reservation information decoded within a discontinuous reception (DRX) active duration. In some embodiments, other benefits of adopting the newly invented resource selection mechanism include: 1. Full utilization of all possible and available sensing and resource reservation results to improve sidelink transmission performance. 2. Being able to flexibly adapt to different operating scenarios while minimizing the chance of Tx collision via ranking-based reporting even when there are limited periodic-based partial sensing results.

FIG. 1 illustrates that, in some embodiments, one or more user equipments (UEs) 10 and one or more user equipments (UEs) 20 of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond, for example providing cellular-vehicle to everything (C-V2X) communication.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
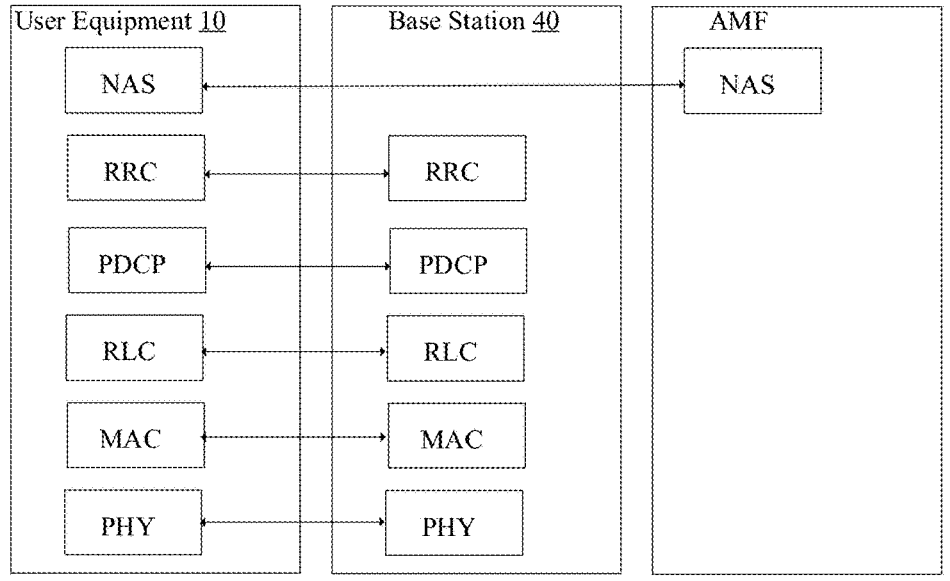
FIG. 2 is a schematic diagram illustrating an example user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 40 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/ from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
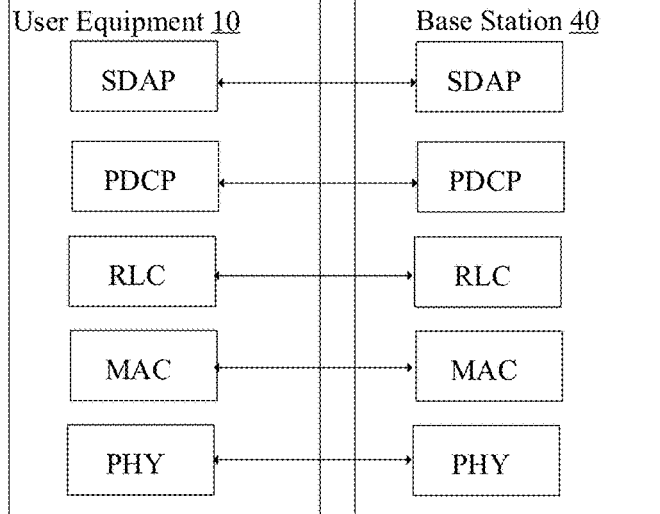
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 40 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 is configured to trigger a resource selection procedure for sidelink (SL) transmission of a SL data, wherein the SL data for transmission has a resource reservation interval set to zero or not provided at all, and the processor 11 is configured to utilize a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data. This can solve issues in the prior art, mitigate a transmission collision, provide a good communication performance, and/ or provide high reliability.

In some embodiments, the sidelink channel decoding result comprises a physical sidelink control channel (PSCCH) decoding result and/or reference signal received power (RSRP) measurement from a sidelink discontinuous reception (DRX) active period. In some embodiments, the sidelink transmission comprises a physical sidelink shared channel (PSSCH) transmission or a PSCCH transmission, and/or the SL data comprises a single medium access control (MAC) packet data unit (PDU) or transport block (TB). In some embodiments, the processor 11 is configured to determine a timing duration of the contiguous partial sensing equal to or less than 32 slots to detect one or more time resource assignments of equal to or less than the 32 slots. In some embodiments, the timing duration of the contiguous partial sensing is selected by the processor 11. In some embodiments, utilizing the periodic-based sensing result from the periodic-based sensing comprises utilizing one or more sensing results from an on-going periodic-based partial sensing to detect a semi-persistent scheduling (SPS) reservation of sidelink resources.

In some embodiments, when at least $Y_{min}$ slots from a set of Y candidate slots of the on-going periodic-based partial sensing are located within a remaining resource selection window (RSW), a candidate resource set ($S_A$) is initialized to the set of all the candidate single-slot resources from the Y candidate slots that are within the remaining RSW, where $Y_{min}$ is a minimum value of Y, and a value of Y is greater than or equal to 1. In some embodiments, a candidate resource set ($S_A$) is initialized to the set of all the candidate single-slot resources within a remaining RSW. In some embodiments, the processor 11 is configured to exclude candidate single-slot resources from the candidate resource set ($S_A$) based on the periodic-based sensing result, the contiguous partial sensing result, and/or the sidelink channel decoding result.

In some embodiments, the processor 11 is configured to report remaining resources from the candidate resource set ($S_A$) after the exclusion. In some embodiments, the processor 11 is configured to report a location of slots from the Y candidate slots that are within the candidate resource set ($S_A$). In some embodiments, the processor 11 is configured to randomly select a time and frequency resource from reported subset of resources. In some embodiments, when the location of the slots from the Y candidate slots that are within the candidate resource set (S_A) is reported, the processor 11 selects resources randomly from the reported slot locations. In some embodiments, if a number of selected resources within the reported slot locations is less than a required number of hybrid automatic repeat request (HARQ) retransmissions for the SL data, the remaining resources are selected from other slots of the reported subset of resources.

FIG. 4 illustrates a resource selection method 610 in sidelink communication by a user equipment (UE) according to an embodiment of the present disclosure. In some embodiments, the method 610 includes: a block 612, triggering a resource selection procedure for sidelink transmission of a SL data, wherein the SL data for transmission has a resource reservation interval set to zero or not provided at all, and a block 614, utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data. This can solve issues in the prior art, mitigate a transmission collision, provide a good communication performance, and/or provide high reliability.

In some embodiments, the sidelink channel decoding result comprises a physical sidelink control channel (PSCCH) decoding result and/or reference signal received power (RSRP) measurement from a sidelink discontinuous reception (DRX) active period. In some embodiments, the sidelink transmission comprises a physical sidelink shared channel (PSSCH) transmission or a PSCCH transmission, and/or the SL data comprises a single medium access control (MAC) packet data unit (PDU) or transport block (TB). In some embodiments, the method further comprises determining a timing duration of the contiguous partial sensing equal to or less than 32 slots to detect one or more time resource assignments of equal to or less than the 32 slots. In some embodiments, the timing duration of the contiguous partial sensing is selected by the UE. In some embodiments, utilizing the periodic-based sensing result from the periodic-based sensing comprises utilizing one or more sensing results from an on-going periodic-based partial sensing to detect a semi-persistent scheduling (SPS) reservation of sidelink resources.

In some embodiments, when at least $Y_{min}$ slots from a set of Y candidate slots of the on-going periodic-based partial sensing are located within a remaining resource selection window (RSW), a candidate resource set (S_A) is initialized to the set of all the candidate single-slot resources from the Y candidate slots that are within the remaining RSW, where $Y_{min}$ is a minimum value of Y, and a value of Y is greater than or equal to 1. In some embodiments, a candidate resource set (S_A) is initialized to the set of all the candidate single-slot resources within a remaining RSW. In some embodiments, the method further comprises excluding candidate single-slot resources from the candidate resource set (S_A) based on the periodic-based sensing result, the contiguous partial sensing result, and/or the sidelink channel decoding result. In some embodiments, the method further comprises reporting remaining resources from the candidate resource set (S_A) after the exclusion.

In some embodiments, the method further comprises reporting a location of slots from the Y candidate slots that are within the candidate resource set (S_A). In some embodiments, the method further comprises randomly selecting a time and frequency resource from reported subset of resources. In some embodiments, when the location of the slots from the Y candidate slots that are within the candidate resource set (S_A) is reported, the UE selects resources randomly from the reported slot locations. In some embodiments, if a number of selected resources within the reported slot locations is less than a required number of hybrid automatic repeat request (HARQ) retransmissions for the SL data, the remaining resources are selected from other slots of the reported subset of resources.

In the present disclosure of an inventive method for resource sensing and selection, intended primarily to be used by a power constrained sidelink (SL) communication user equipment (UE), and requested/triggered by its higher layer in slot n to report a subset of resources for selection as part of resource allocation mode 2 for physical sidelink shared channel (PSSCH)/physical sidelink control channel (PSCCH) transmission of a medium access control (MAC) packet data unit (PDU) or transport block (TB), the UE physical layer is further configured by its higher layer to performed partial sensing and provided with a resource reservation interval parameter $P_{rsvp\_TX}$ for a SL data set to zero or this parameter is not provided at all (i.e., for an aperiodic traffic/transmission).

When UE transmission of both periodic and aperiodic traffics is allowed in a resource pool (i.e., parameter sl-MultiReserveResource for the resource pool is configured as enabled), a periodic-based partial sensing should be performed by a SL transmitter UE (Tx-UE) according to a (pre-)configured set of resource reserve periods to detect SPS reservations for periodic traffic/transmission from other UEs. Moreover, the Tx-UE should also perform a contiguous partial sensing of up to 32 slots for detecting dynamic reservations of SL resources. However, when the Tx-UE is triggered (e.g., in slot n) to select SL resources for an aperiodic traffic/transmission, as explained earlier it is not possible for the Tx-UE to have already performed the periodic-based partial sensing intended for this aperiodic transmission and obtained pre-sensing results prior to the resource selection triggering (before slot n), since the arrival of aperiodic traffic/data is unpredictable. Consequently, there is a risk of collision between the aperiodic transmission in resources that are already SPS reserved by other UEs prior to the trigger. On the other hand, it should still be possible for the Tx-UE to perform the contiguous partial sensing within the first 32 slots after the triggering to detect dynamic resource assignments/reservations.

Figures 6, 7:
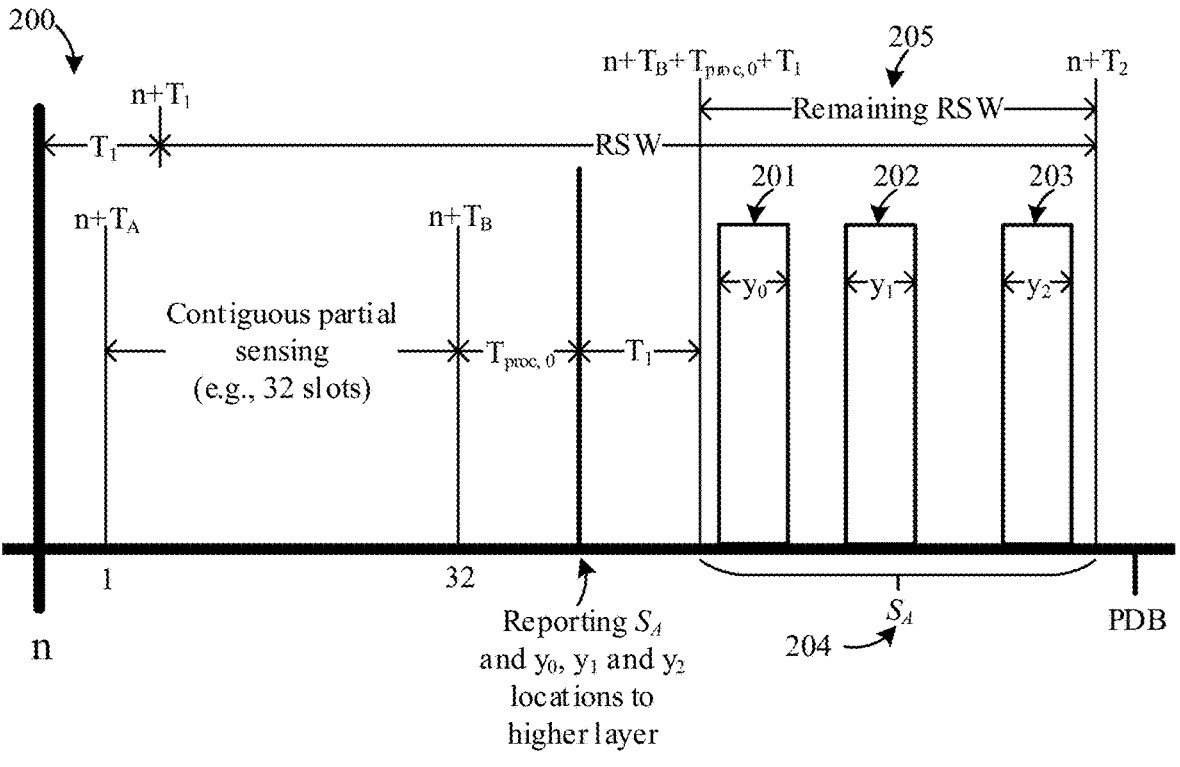
FIG. 6 is a schematic diagram illustrating an exemplary illustration of a proposed method of utilizing periodic-based and contiguous partial sensing results for SL transmission of aperiodic SL data traffic with priority ranking for certain slots according to an embodiment of the present disclosure.
FIG. 7 is a block diagram of a system for wireless communication according to an embodiment of the present disclosure.

FIG. 5 illustrates an exemplary illustration of a proposed method of utilizing periodic-based and contiguous partial sensing results for sidelink (SL) transmission of aperiodic SL data traffic according to an embodiment of the present disclosure. FIG. 6 illustrates an exemplary illustration of a proposed method of utilizing periodic-based and contiguous partial sensing results for SL transmission of aperiodic SL data traffic with priority ranking for certain slots according to an embodiment of the present disclosure. FIG. 5 and FIG. 6 illustrate that, in some embodiments, in order to resolve this unavailability of periodic-based pre-sensing results for the aperiodic SL transmission and to minimize the chance of transmission collision in resources with SPS reservation, the following resource sensing and selection method should be adopted, in conjunction with exemplary illustrations in diagram 100 of FIG. 5 and diagram 200 of FIG. 6.

If UE (physical layer) is triggered in slot n 101 to report a subset of resources to the higher layer in resource allocation mode 2 for resource selection and partial sensing is configured by higher layer, then one or more of the following steps are used to report the subset of resources for selection when a parameter sl-MultiReserveResource for the provided resource pool is configured as enabled and a resource reservation interval parameter $P_{rsvp\_TX}$ for a SL data is set to zero or this parameter is not provided at all (i.e., for an aperiodic data transmission).

Step 1: UE determines a resource selection window (RSW) for a time interval between $n+T_1$ 102 and $n+T_2$ 103, where $T_1$ 104 is selected by UE implementation according to $$0 \leq T_1 \leq T_{proc,1}^{SL} \text{ and } T_{proc,1}^{SL}$$

denotes a UE processing time to prepare PSCCH/PSSCH for SL transmission with a minimum value of 3 slots. $T_2$ is also selected by UE implementation according to $T_{2min} \leq T_2 \leq$ remaining packet delay budget (PDB) of the MAC PDU or TB, and $T_{2min}$ defines a minimum time length for the RSW with a value range between 1 slot for 15 kHz sub-carrier spacing (SCS) and 160 slots for 120 kHz SCS.

Step 2: UE based on its implementation determines a sensing window $[n+T_A, n+T_B]$ 105, 106 and performs contiguous partial sensing of up to 32 slots 107 to detect dynamic resource assignments from other UEs within the said sensing window by decoding PSCCH and measuring RSRP in these slots, where $T_A$ and $T_B$ are selected up to UE implementation under the conditions that $T_A \geq 0$ and $0 \leq T_B - T_A \leq 31$. Note that, the contiguous partial sensing include slot $n+T_A$ 105 and $n+T_B$ 106.

Step 3: When UE has an on-going periodic-based partial sensing process (e.g., for a periodic traffic/transmission of another MAC PDU or TB) and at least $Y_{min}$ slots 110 from the Y candidate slots 109 are located within the remaining RSW $$\left[n + T_B + T_{proc,0}^{SL} + T_1, n + T_2\right] 108,$$

a set $S_A$ 111 is initialized to the set of all the candidate single-slot resources from the Y candidate slots that are within the remaining RSW $$\left[n + T_B + T_{proc,0}^{SL} + T_1, n + T_2\right].$$

Alternatively, the set $S_A$ 204 is initialized to the set of all the candidate single-slot resources of all the slots within the remaining RSW $$\left[n + T_B + T_{proc,0}^{SL} + T_1, n + T_2\right] 205.$$

205. For example, when there is no on-going periodic-based partial sensing process performed by the UE in the same resource pool or the number of slots from the Y candidate slots within the remaining RSW is very limited or less than $Y_{min}$ 201, 202, 203.

Step 4: UE performs exclusion of candidate single-slot resources from the set $S_A$ 111 or 204 based on all available sensing results from the contiguous partial sensing 107, any of applicable on-going periodic-based partial sensing processes (e.g., with at least one slot from Y candidate slots falls within the remaining RSW), and decoded PSCCH plus measured RSRP within a discontinuous reception (DRX) active duration if sidelink DRX is configured for the UE.

A candidate single-slot resource is excluded from the set $S_A$ 111 or 204 when it overlaps with a SPS reserved or dynamically assigned resource indicated in a received sidelink control information (SCI), and the measured RSRP for the received SCI is higher than a threshold corresponding to the priority value indicated in the received SCI and the L1 priority for transmission provided by the higher layer.

Step 5: UE reports the remaining resources from the set $S_A$ to higher layer (a subset of resources from the initial $S_A$ after exclusion). The UE may additionally report the slot locations/indices of all slots from the Y candidate slots that fall within the set $S_A$ 201, 202, 203 (i.e., remaining RSW 205), since these slots are part of an on-going periodic-based partial sensing process such that any remaining resources within these slot locations would be free from Tx collision with SPS reservations from other UEs.

Step 6: The higher layer (i.e., MAC layer) randomly selects time and frequency resource from the reported subset of resources indicated by the physical layer for the PSSCH/PSCCH transmission. The random selection should also ensure the minimum time gap between any two selected resources in case that PSFCH is configured for the resource pool and that a resource can be indicated by the time resource assignment of a SCI for a retransmission.

When the slot locations within the set $S_A$ that correspond to one or more slots from the Y candidate slots of an on-going periodic-based partial sensing is also reported to the higher layer 201, 202, 203, these slots are given a higher ranking/priority for the resource selection. For example, the higher layer selects resources randomly within the reported/higher ranking slot locations firstly 201, 202, 203, subject to the same above two timing restrictions. If the number of selected resources within the reported slot locations is less than the required/selected number of HARQ retransmissions for the MAC PDU or TB, the remaining required resources are selected from other slots within the set $S_A$.

In summary, in some embodiments, in order to mitigate the Tx collision problem from transmitting aperiodic traffic in resources with SPS reservation due to unpredictable data arrival timing, a UE physical layer opportunistically utilize periodic-based and contiguous partial sensing results and PSCCH decoding results from SL DRX active period (if available) during a resource selection procedure triggered by higher layer for PSSCH/PSCCH transmission of an aperiodic MAC PDU or TB. Specifically, in some embodiments, aspects of the innovation that lead to improving the deficiency of aperiodic transmissions includes:

1. Setting the timing duration for the contiguous partial sensing $T_A$ and $T_B$, which may be flexibly selected by UE implementation under the condition that $T_A \geq 0$ and $0 \leq T_B - T_A \leq 31$, to detect dynamic resource assignments of up to 32 slots from other UEs.

2. Opportunistically utilize sensing results from an on-going periodic-based partial sensing to detect SPS reservation of SL resources from other UEs. When there are at least $Y_{min}$ slots from a set of Y candidate slots of the on-going periodic-based partial sensing are located within the remaining RSW $$\left[n + T_B + T_{proc,0}^{SL} + T_1, n + T_2\right],$$

a candidate resource set $S_A$ is initialized to all the slots from the Y candidate slots that are within the remaining RSW. Alternatively, the set $S_A$ is initialized to the set of all the candidate single-slot resources of all slots within the remaining RSW $$\left[ n + T_B + T_{proc,0}^{SL} + T_1, n + T_2 \right].$$

3. UE excludes candidate single-slot resources from the set $S_A$ based on all available sensing results from the contiguous partial sensing, the on-going periodic-based partial sensing process (if available), and decoded PSCCH plus measured RSRP within a SL-DRX active duration (if SL-DRX is configured).
4. UE reports the remaining resources from set $S_A$ to the higher layer and it may additionally report the location of all slots from the Y candidate slots that fall within the set $S_A$.
5. The MAC layer randomly selects time and frequency resource from the reported subset of resources. When the location of all slots from the Y candidate slots that fall within the set $S_A$ is also reported, the MAC layer firstly selects resources randomly from these reported slot locations. If the number of selected resources within the reported slot locations is less than the required number of HARQ retransmissions for the MAC PDU or TB, the remaining required resources are selected from other slots within the reported subset.

In some embodiments, other benefits of adopting the newly invented resource selection mechanism include: 1. Higher data rate and better user experience for services using sidelink technology can be achieved from enhanced radio performance with less transmission collisions and interference among terminal devices operating in the same area. 2. Lower power consumption for sidelink communication can be also achieved from reduced number of retransmissions due to collision avoidance means longer operating time for the terminal device.

Commercial interests for some embodiments are as follows. 1. Solving issues in the prior art. 2. Mitigating a transmission collision. 3. Providing good communication performance. 4. Providing high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing direct device-to-device (D2D) wireless communication services.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource selection method in sidelink communication by a user equipment (UE), comprising:

triggering a resource selection procedure for sidelink (SL) transmission of a SL data, wherein the SL data for transmission has a resource reservation interval set to zero or not provided at all; and utilizing a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data;

wherein utilizing the periodic-based sensing result from the periodic-based sensing comprises utilizing one or more sensing results from an on-going periodic-based partial sensing to detect a semi-persistent scheduling (SPS) reservation of sidelink resources; and wherein when at least $Y_{min}$ slots from a set of Y candidate slots of the on-going periodic-based partial sensing are located within a resource selection window (RSW), a candidate resource set ($S_A$) is initialized to the set of all the candidate single-slot resources from the Y candidate slots that are within the RSW, where $Y_{min}$ is a minimum value of Y, and a value of Y is greater than or equal to 1.

2. The method of claim 1, wherein the sidelink channel decoding result comprises a physical sidelink control channel (PSCCH) decoding result and/or reference signal received power (RSRP) measurement from a sidelink discontinuous reception (DRX) active period.

3. The method of claim 1, wherein the sidelink transmission comprises a physical sidelink shared channel (PSSCH) transmission or a PSCCH transmission, and/or the SL data comprises a single medium access control (MAC) packet data unit (PDU) or transport block (TB).

4. The method of claim 1, further comprising determining a timing duration of the contiguous partial sensing equal to or less than 32 slots to detect one or more time resource assignments of equal to or less than the 32 slots.

5. The method of claim 4, wherein the timing duration of the contiguous partial sensing is selected by the UE.

6. The method of claim 1, further comprising excluding candidate single-slot resources from the candidate resource set $(S_A)$ based on the periodic-based sensing result, the contiguous partial sensing result, and/or the sidelink channel decoding result.

7. The method of claim 6, further comprising reporting remaining resources from the candidate resource set $(S_A)$ after the exclusion.

8. A user equipment (UE), comprising:
a memory;
a transceiver; and
a processor coupled to the memory and the transceiver;
wherein the processor is configured to trigger a resource selection procedure for sidelink (SL) transmission of a SL data, wherein the SL data for transmission has a resource reservation interval set to zero or not provided at all;
wherein the processor is configured to utilize a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data;
wherein utilizing the periodic-based sensing result from the periodic-based sensing comprises utilizing one or more sensing results from an on-going periodic-based partial sensing to detect a semi-persistent scheduling (SPS) reservation of sidelink resources; and
wherein when at least $Y_{min}$ slots from a set of Y candidate slots of the on-going periodic-based partial sensing are located within a resource selection window (RSW), a candidate resource set $(S_A)$ is initialized to the set of all the candidate single-slot resources from the Y candidate slots that are within the RSW, where $Y_{min}$ is a minimum value of Y, and a value of Y is greater than or equal to 1.

9. The UE of claim 8, wherein the sidelink transmission comprises a physical sidelink shared channel (PSSCH) transmission or a PSCCH transmission, and/or the SL data comprises a single medium access control (MAC) packet data unit (PDU) or transport block (TB).

10. The UE of claim 8, wherein the processor is configured to determine a timing duration of the contiguous partial sensing equal to or less than 32 slots to detect one or more time resource assignments of equal to or less than the 32 slots.

11. The UE of claim 10, wherein the timing duration of the contiguous partial sensing is selected by the processor.

12. The UE of claim 8, wherein a candidate resource set $(S_A)$ is initialized to the set of all the candidate single-slot resources within the RSW.

13. The UE of claim 8, wherein the processor is configured to exclude candidate single-slot resources from the candidate resource set $(S_A)$ based on the periodic-based sensing result, the contiguous partial sensing result, and/or the sidelink channel decoding result.

14. The UE of claim 13, wherein the processor is configured to report remaining resources from the candidate resource set $(S_A)$ after the exclusion.

15. The UE of claim 14, wherein the processor is configured to report a location of slots from the Y candidate slots that are within the candidate resource set $(S_A)$.

16. A non-transitory machine-readable storage medium having stored thereon instructions that, when executed by a computer, cause the computer to:
trigger a resource selection procedure for sidelink (SL) transmission of a SL data, wherein the SL data for transmission has a resource reservation interval set to zero or not provided at all; and
utilize a periodic-based sensing result from a periodic-based sensing, a contiguous partial sensing result from a contiguous partial sensing, and/or a sidelink channel decoding result from a sidelink channel decoding during the resource selection procedure for sidelink transmission of the SL data;
wherein utilizing the periodic-based sensing result from the periodic-based sensing comprises utilizing one or more sensing results from an on-going periodic-based partial sensing to detect a semi-persistent scheduling (SPS) reservation of sidelink resources; and
wherein when at least $Y_{min}$ slots from a set of Y candidate slots of the on-going periodic-based partial sensing are located within a resource selection window (RSW), a candidate resource set $(S_A)$ is initialized to the set of all the candidate single-slot resources from the Y candidate slots that are within the RSW, where $Y_{min}$ is a minimum value of Y, and a value of Y is greater than or equal to 1.

* * * * *